(12) United States Patent
Oliver et al.

(10) Patent No.: US 7,814,545 B2
(45) Date of Patent: Oct. 12, 2010

(54) MESSAGE CLASSIFICATION USING CLASSIFIERS

(75) Inventors: Jonathan J. Oliver, San Carlos, CA (US); Scott Roy, San Jose, CA (US); Scott D. Eikenberry, Menlo Park, CA (US); Bryan Kim, Mountain View, CA (US); David A. Koblas, Los Altos, CA (US); Brian K. Wilson, Palo Alto, CA (US)

(73) Assignee: SonicWALL, Inc., San Jose, CA (US)

( * ) Notice: Subject to any disclaimer, the term of this patent is extended or adjusted under 35 U.S.C. 154(b) by 76 days.

(21) Appl. No.: 11/927,493

(22) Filed: Oct. 29, 2007

(65) Prior Publication Data

US 2008/0097946 A1    Apr. 24, 2008

Related U.S. Application Data

(63) Continuation of application No. 10/650,487, filed on Aug. 27, 2003.

(60) Provisional application No. 60/489,148, filed on Jul. 22, 2003.

(51) Int. Cl.
   *G06F 11/30*    (2006.01)
   *G06F 12/14*    (2006.01)

(52) U.S. Cl. .................................. 726/22; 713/194

(58) Field of Classification Search ............... 713/154; 726/13–14, 22; 709/206, 224; 707/5–6
   See application file for complete search history.

(56) References Cited

U.S. PATENT DOCUMENTS

| | | | |
|---|---|---|---|
| 5,768,422 A | 6/1998 | Yaeger | |
| 6,023,723 A | 2/2000 | McCormick et al. | |
| 6,112,227 A | 8/2000 | Heiner | |
| 6,199,102 B1 | 3/2001 | Cobb | |
| 6,421,709 B1 | 7/2002 | McCormick et al. | |
| 6,650,890 B1 | 11/2003 | Irlam et al. | |
| 6,675,162 B1 * | 1/2004 | Russell-Falla et al. | 707/5 |
| 6,778,941 B1 * | 8/2004 | Worrell et al. | 702/176 |
| 6,779,021 B1 * | 8/2004 | Bates et al. | 709/206 |
| 6,785,728 B1 | 8/2004 | Schneider et al. | |
| 6,810,404 B1 | 10/2004 | Ferguson et al. | |

(Continued)

OTHER PUBLICATIONS

Dwork, Cynthia, et al. "Pricing via Processing or Combating Junk Mail," CRYPTO '92, Springer-Verlag LNCS 740, pp. 139-147, 1992.

(Continued)

*Primary Examiner*—Minh Dieu Nguyen
(74) *Attorney, Agent, or Firm*—Carr & Ferrell LLP

(57) ABSTRACT

A system and method are disclosed for improving a statistical message classifier. A message may be tested with a machine classifier, wherein the machine classifier is capable of making a classification on the message. In the event the message is classifiable by the machine classifier, the statistical message classifier is updated according to the reliable classification made by the machine classifier. The message may also be tested with a first classifier. In the event that the message is not classifiable by the first classifier, it is tested with a second classifier, wherein the second classifier is capable of making a second classification. In the event that the message is classifiable by the second classifier, the statistical message classifier is updated according to the second classification.

21 Claims, 3 Drawing Sheets

U.S. PATENT DOCUMENTS

| | | | |
|---|---|---|---|
| 6,941,348 | B2 | 9/2005 | Petry et al. |
| 7,222,157 | B1* | 5/2007 | Sutton et al. ............... 709/206 |
| 2002/0199095 | A1 | 12/2002 | Bandini et al. |
| 2003/0088627 | A1 | 5/2003 | Rothwell et al. |
| 2003/0195937 | A1* | 10/2003 | Kircher et al. ............. 709/207 |
| 2003/0204569 | A1 | 10/2003 | Andrews et al. |
| 2003/0233418 | A1 | 12/2003 | Goldman |
| 2004/0024639 | A1 | 2/2004 | Goldman |
| 2004/0117648 | A1* | 6/2004 | Kissel ....................... 713/200 |
| 2004/0128355 | A1 | 7/2004 | Chao et al. |
| 2004/0158554 | A1 | 8/2004 | Trottman |
| 2004/0167964 | A1* | 8/2004 | Rounthwaite et al. ....... 709/206 |
| 2004/0177110 | A1 | 9/2004 | Rounthwaite et al. |
| 2004/0177120 | A1 | 9/2004 | Kirsch |
| 2004/0181581 | A1 | 9/2004 | Kosco |
| 2004/0260776 | A1 | 12/2004 | Starbuck et al. |
| 2004/0267886 | A1 | 12/2004 | Malik |
| 2005/0015626 | A1 | 1/2005 | Chasin |
| 2005/0055410 | A1 | 3/2005 | Landsman et al. |
| 2005/0125667 | A1 | 6/2005 | Sullivan et al. |
| 2008/0104186 | A1* | 5/2008 | Wieneke et al. ............. 709/206 |
| 2009/0132669 | A1* | 5/2009 | Milliken et al. ............. 709/206 |

OTHER PUBLICATIONS

Von Ahn, Luis, et al., "Telling Humans and COmputers Apart (Automatically) or How Lazy Cryptographers do AI," Communications to the ACM, Feb. 2004.

Skoll, David F., "How to Make Sure a Human is Sending You Mail," Google Groups Thread (Nov. 17, 1996).

Byrne, Julian, "My Spamblock," Google Groups Thread (Jan. 19, 1997).

Guilmette, Ronald F., "To Mung or Not to Mung," Google Groups Thread (Jul. 24, 1997).

Templeton, Brad, "Viking-12 Junk E-Mail Blocker," (believed to have last been updated Jul. 15, 2003).

"Majordomo FAQ," Oct. 20, 2001.

Langberg, Mike, "Spam Foe Needs Filter of Himself," (Email Thread Dated Apr. 5, 2003).

McCullagh, Declan, "In-Boxes that Fight Back," News.com, May 19, 2003.

Gabrilovich et al., "The Homograph Attack", Communications of the ACM, 45(2):128, Feb. 2002.

Cranor, Lorrie, et al., "Spam!," Communications of the ACM, vol. 41, Issue 8, pp. 74-83, Aug. 1998.

Jung, Jaeyeon, et al., "An Empirical Study of Spam Traffic and the Use of DNS Black Lists," IMC'04, Taormina, Sicily, Italy, Oct. 25-27, 2004.

Weinstein, Lauren, "Spam Wars," Communications of the ACM, vol. 46, Issue 8, p. 136, Aug. 2003.

Gomes, Luiz, et al., "Characterizing a Spam Traffic," in the Proc. of the 4th ACM SIGCOMM Conference on Internet Measurement, Sicily, Italy, pp. 356-369, 2004.

Balvanz, Jeff, et al., "Spam Software Evaluation, Training, and Support: Fighting Back to Reclaim the Email Inbox," in the Proc. of the 32nd Annual ACM SIGUCCS Conference on User Services, Baltimore, MD, pp. 385-387, 2004.

Paul Graham, "A Plan for Spam," 2004 Spam Conference, Cambridge, MA: http://www.paulgraham.com/spam.html.

"Will Filters Kill Spam?" Dec. 2002: http://www.paulgraham.com/wfks.html.

Paul Graham, "Better Bayesian Filtering," 2003 Spam Conference, Cambridge, MA: http:///www.paulgraham.com/better.html.

Patrick Pantel, et al., "SpamCop: A Spam Classification & Organization Program," Mar. 11, 1998, Dept. of Computer Science, University of Manitoba, Winnipeg, Manitoba, Canada.

Jason Rennie, "ifile v.0.1 Alpha," Aug. 3, 1996, Carnegie Mellon University: http://www.ai.mit.edu/~jrennie/ifile/oldREADME-0.1A.

William S. Yerazunis, "Sparse Binary Polynomial Hashing and the CRM114 Discriminator," 2003 Spam Conference, Cambridge, MA.

Mehran Sahami, et al., "A Bayesian Approach to Filtering Junk E-Mail," Proceedings of AAAI-98 Workshop on Learning for Text Categorization, Jul. 1998.

* cited by examiner

US 7,814,545 B2

MESSAGE CLASSIFICATION USING CLASSIFIERS

CROSS REFERENCE TO RELATED APPLICATIONS

This application is a continuation and claims the priority benefit of U.S. patent application Ser. No. 10/650,487 filed Aug. 27, 2003 and entitled "Statistical Message Classifier," which claims the priority benefit of U.S. provisional patent application No. 60/489,148 filed Jul. 22, 2003 and entitled Leveraged Statistical Filters for Detecting Spam, the disclosure of which is incorporated herein by reference for all purposes.

FIELD OF THE INVENTION

The present invention relates generally to message classification. More specifically, a technique for avoiding junk messages (spam) is disclosed.

BACKGROUND OF THE INVENTION

Electronic messages have become an indispensable part of modern communication. Electronic messages such as email or instant messages are popular because they are fast, easy, and have essentially no incremental cost. Unfortunately, these advantages of electronic messages are also exploited by marketers who regularly send out unsolicited junk messages. The junk messages are referred to as "spam", and spam senders are referred to as "spammers". Spam messages are a nuisance for users. They clog people's inbox, waste system resources, often promote distasteful subjects, and sometimes sponsor outright scams.

Personalized statistical search is a technique used by some systems for detecting and blocking spam messages. Personalized statistical searches typically depend on users to sort the messages into categories. For example, the users may put spam messages into a junk folder and keep good messages in the inbox. The spam protection program periodically updates the personalized statistical searcher by processing the categorized messages. When a new message comes in, the improved statistical searcher determines whether the incoming message is spam. The updating of the personalized statistical searcher is typically done by finding the tokens and features in the messages and updating a score or probability associated with each feature or token found in the messages. There are several techniques that are applicable for computing the score or probability. For example, if "cash" occurs in 200 of 1,000 spam messages and three out of 500 non-spam messages, the spam probability associated with the word is $(200/1000)/(3/500+200/1000)=0.971$. A message having a high proportion of tokens or features associated with high spam probability is likely to be a spam message.

Personalized statistical searches have been gaining popularity as a spam fighting technique because of several advantages. Once trained, the spam filter can detect a large proportion of spam effectively. Also, the filters adapt to learn the type of words and features used in both spam and non-spam. Because they consider evidence of spam as well as evidence of good email, personal statistical searches yield few false positives (legitimate non-spam email that are mistakenly identified as spam). Additionally, the filters can be personalized so that a classification is tailored for the individual. However, personalized statistical searchers also have several disadvantages. Since their training requires messages that are categorized by the users, they are typically deployed on the client, and are not well suited for server deployment. Also, classifying email messages manually is a labor intensive process, therefore is not suitable for deployment at the corporate level where large amounts of messages are received. It would be desirable to have statistical searches that do not depend on manual classification by users, and are suitable for server deployment and corporate level deployment.

BRIEF DESCRIPTION OF THE DRAWINGS

The present invention will be readily understood by the following detailed description in conjunction with the accompanying drawings, wherein like reference numerals designate like structural elements, and in which.

SUMMARY OF THE CLAIMED INVENTION

Figure 1:
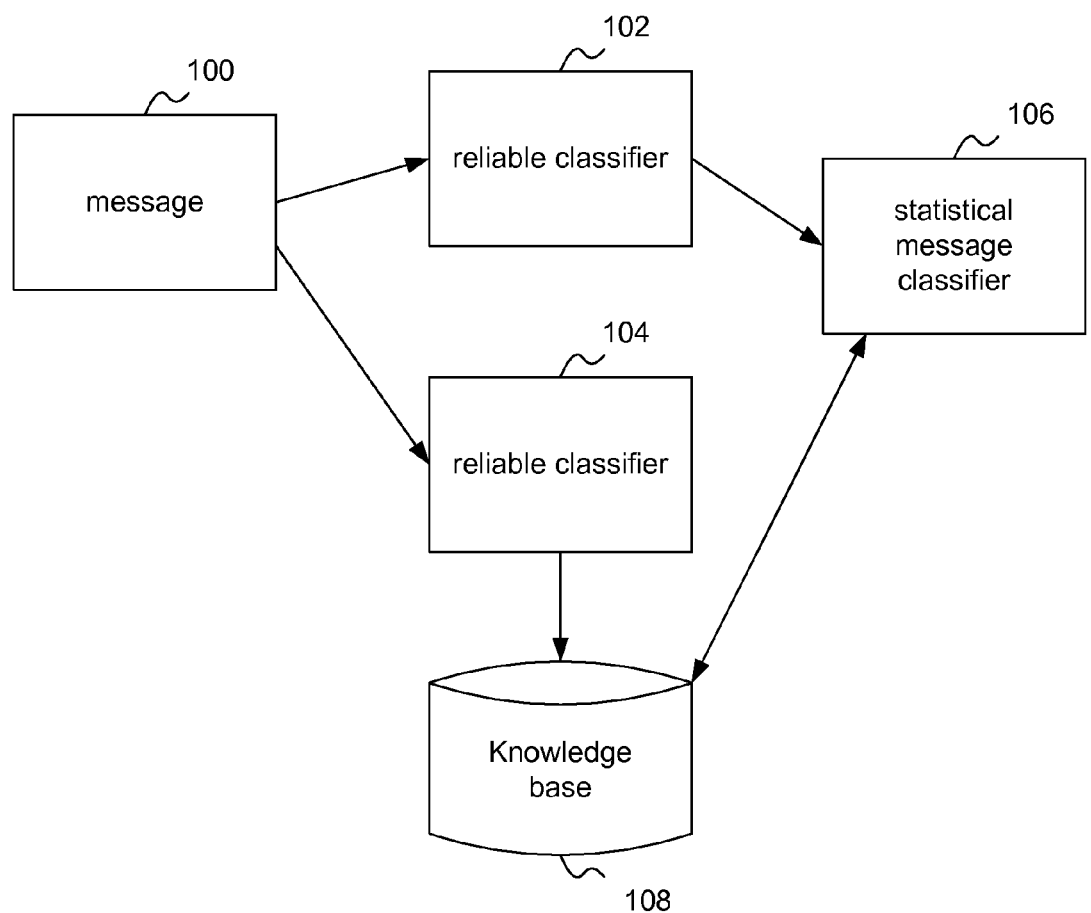
FIG. 1 is a block diagram illustrating a statistical message filter embodiment.

In a first claimed embodiment of the present invention, a method for classifying a message is recited. Through this method, a message is received for analysis by a first classifier application. The first classifier application is executable by a processor to determine that the received message is not an unsolicited message. The received message has a sender address. A database of known sender addresses is accessed in response to execution of the first classifier application by the processor. The known sender addresses indicate that a message from a sender in the database is an allowable message. A determination is then made that the sender address of the received message is not in the database of known sender addresses whereby analysis of the received message takes place with a second classifier application. The second classifier application is executable by the processor to determine that the received message is an unsolicited message. Execution of the second classifier application by the processor applies a collaborative fingerprint to the received message. Finally, the received message is processed in accordance with a result derived from analysis of the received message by the second classifier application.

In a second claimed embodiment of the present invention, an apparatus for classifying a message is recited. The apparatus includes a processor and memory. The memory is configured to store a first classifier application and a second classifier application. The first classifier application is executable by the processor to determine that a message received by the apparatus over a network is not an unsolicited message, the received message having a sender address. The second classifier application is executable by the processor to determine that the received message is an unsolicited message, wherein execution of the second classifier application by the processor applies a collaborative fingerprint to the received message. The apparatus also includes a database of known sender addresses accessible by the first classifier application in response to execution of the first classifier by the processor. The known sender addresses indicate that a message from a sender in the database is an allowable message, whereby a determination may be made that the sender address of the received message is not in the database of known sender addresses. As a result, the received message is processed in accordance with a result derived from analysis of the received message by the second classifier application.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, are referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

An improved technique for improving a statistical message classifier is disclosed. In some embodiments, a classifier tests messages and attempts to make a classification. If the message is classified by the classifier, information pertaining to the message is used to update the statistical message classifier. The classifier is preferably a reliable classifier such as a whitelist classifier, a collaborative fingerprinting classifier, an image analyzer, a probe account, a challenge-response classifier, or any other appropriate classifier. A reliable good classifier and a reliable junk classifier are sometimes used in some embodiments. In some embodiments, the same classifier may classify both good and junk messages. The classifiers may be machine classifiers or user-augmented classifiers.

As used herein, a message refers to an e-mail message, an instant message, a text message, and/or any other appropriate information transmitted electronically. For the sake of clarity, in the following examples, techniques used for e-mail messages are discussed in detail; however, the techniques are also applicable for any other types of messages.

FIG. 1 is a block diagram illustrating a statistical message filter embodiment. Reliable classifiers 102 and 104 process incoming message 100 to make a classification. Although two reliable classifiers are shown, one or more classifiers may be used in other embodiments and the number of reliable classifiers may vary for different implementations. The message may be classified as spam, non-spam, or any other appropriate category. A statistical message classifier 106 is trained using the results from the reliable classifiers periodically or as messages are processed. The reliable classifier may directly update the statistical message classifier, or store the results in a knowledge base 108 that is then used to update the statistical message classifier.

The reliability of a classifier depends on how accurately it makes a classification. The reliable classifiers are so named because when they make a classification, the classification is reliable and the outcome of the classification is likely to be correct. It should be noted that the reliable classifiers sometimes do not make any classification of a message. For example, a reliable classifier may classify 20% of the messages it processes as spam, 10% as non-spam, and makes no judgment on the rest 70% of the messages. Of the messages that are determined to be either spam or non-spam, the probability of erroneous classification may be less than 1%. While the actual percentages and criteria may vary for different implementations, a classifier is considered to be reliable as long as it is able to in some cases make a more accurate classification than the statistical message classifier under training.

There are several types of reliable classifiers that may be applicable for statistical message filtering, including: an adaptive whitelist that reliably classifies non-spam messages, a collaborative fingerprinting filter that classifies spam messages, an image analyzer that is capable of determining flesh tones in pornographic spam messages, a probe account that does not belong to any legitimate user and presumably only receives spam messages, a challenge-response classifier, etc. Once a classification is made by the reliable classifier, the statistical message classifier is updated accordingly. In some embodiments, the statistical message classifier includes a knowledge base that tracks the spam probability of features in classified messages. The features may include words, tokens, message identifier, message protocol, address, hypertext markup language document (HTML) properties or any other appropriate aspects of the message that can be used to train the statistical message classifier.

The reliable classifiers may update the statistical message classifier by processing messages such as previously stored messages, outgoing messages and incoming messages. The reliable classifiers are preferably machine classifiers that can process large amounts of messages more efficiently than manually classifying the messages. Using machine classifiers makes a statistical message classifier more suitable for server and corporate level deployment.

Figure 2:
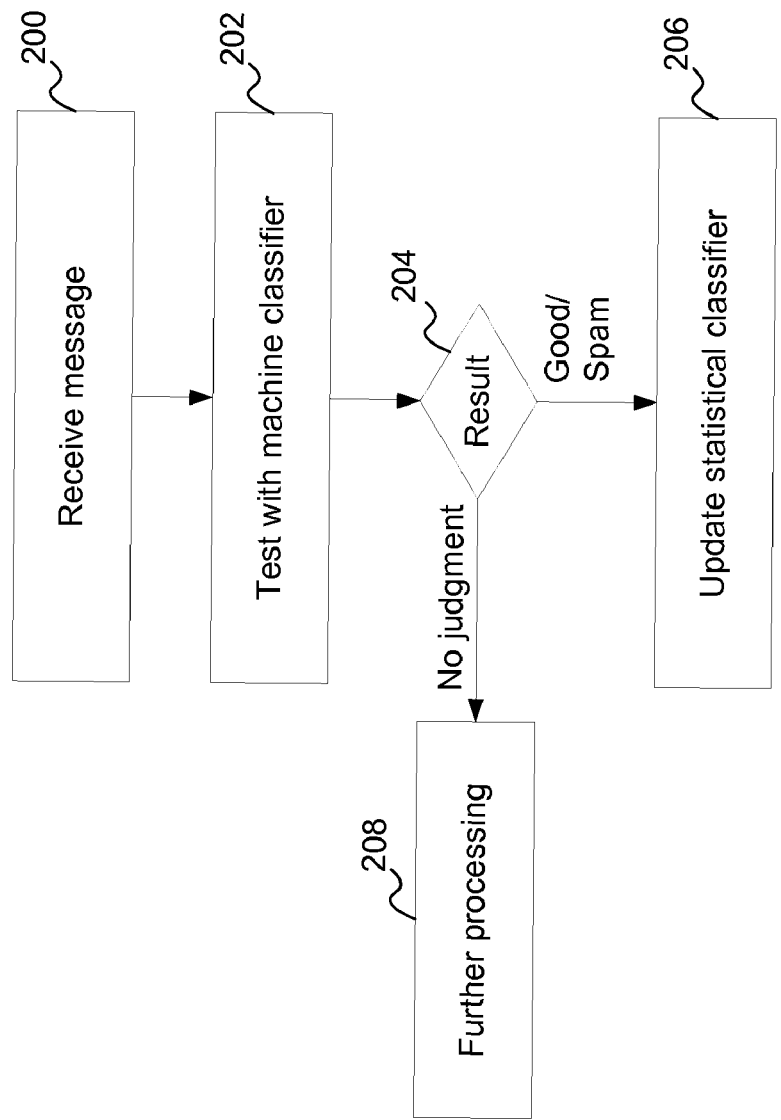
FIG. 2 is a flowchart illustrating the processing of a message by a system embodiment that includes a statistical classifier.

FIG. 2 is a flowchart illustrating the processing of a message by a system embodiment that includes a statistical classifier. Once a message is received (200), it is tested with a machine classifier (202). The machine classifier is preferably a reliable one although other classifiers may also be used. The classifier attempts to classify the message and provides a classification result (204). If the message is classified as either good or spam, the statistical classifier is updated (206). If, however, the machine classifier does not make a judgment on the message, the message is then further processed (208). In some embodiments, the message is delivered to the user. In some embodiments, the message is further classified by other classifiers. In some embodiments, the statistical classifier is used to further test the message.

The techniques may be used to update a statistical message classifier for an individual user or a group of users. In some embodiments, the users share a statistical message classifier that is updated when a reliable classifier classifies the message. In some embodiments, the users have their own statistical message classifiers. Once a reliable classifier classifies the message, the statistical message classifiers of the individual users are updated.

Figure 3:
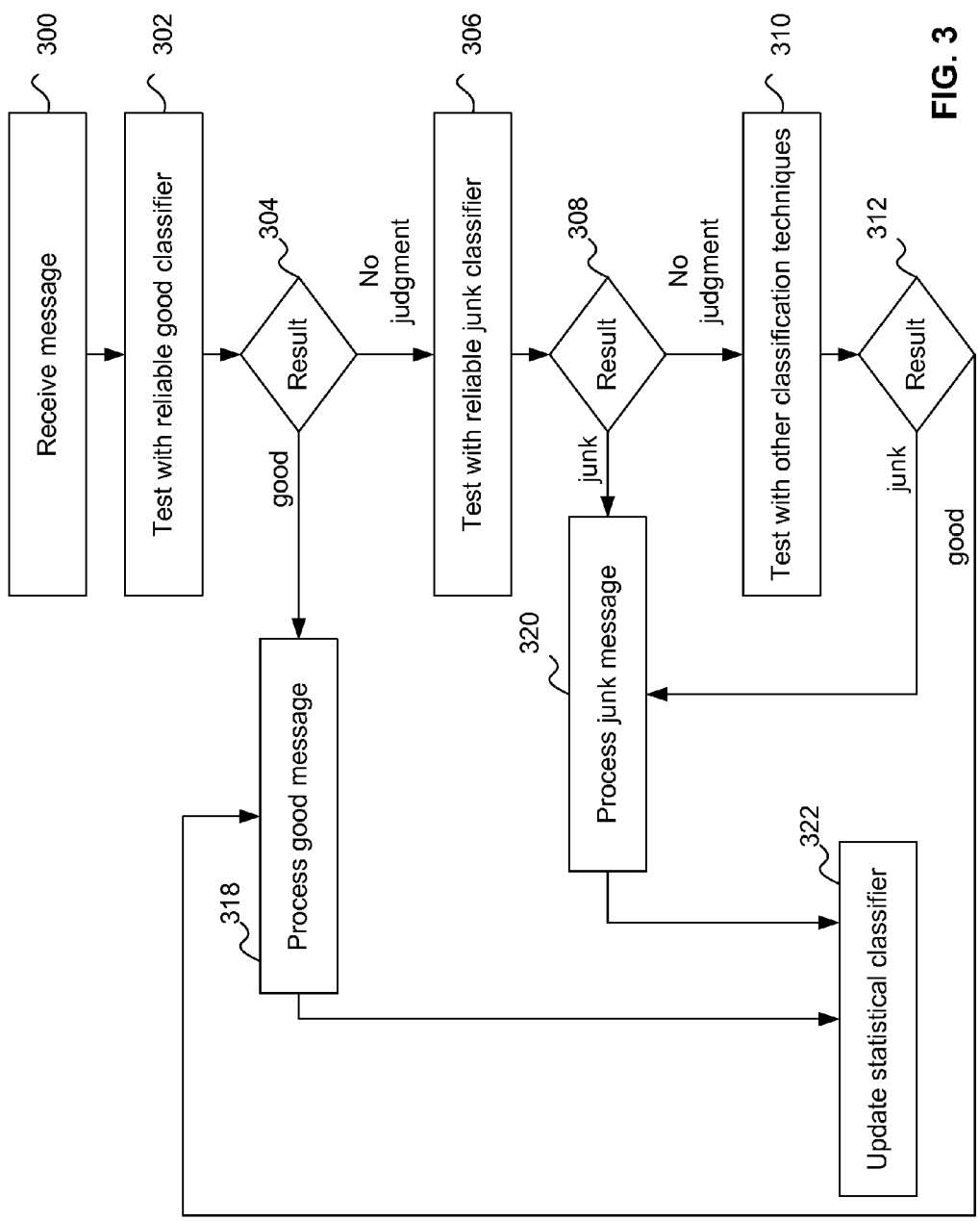
FIG. 3 is a flowchart illustrating the processing of a message by another system embodiment that includes a statistical classifier.

FIG. 3 is a flowchart illustrating the processing of a message by another system embodiment that includes a statistical classifier. Once a message is received (300), it is first tested with a reliable good classifier (302). The reliable good classifier is able to make a classification of messages that are good (i.e., non-spam) reliably. In one embodiment the reliable good classifier is a whitelist classifier that classifies the message based on a database of known allowable sender addresses. The testing result may indicate that the message is good, and control is transferred from 304 to 318, where the good message is processed accordingly; in some embodiments the message is delivered to the intended recipient. If, however, the reliable good classifier makes no judgment on whether the message is good, control is transferred from 304 to 306, where the message is further tested with a reliable junk classifier. Although the reliable good classifier and the reliable junk classifier are two distinct classifiers in this embodiment, a single classifier may function both as the reliable good classifier and the reliable junk classifier.

The reliable junk classifier, for example, a classifier that uses a collaborative fingerprinting technique, is capable of reliably determining whether a message is junk. If the message is determined to be junk, control is transferred from 308 to 320 where the junk message is processed accordingly. In some embodiments, the junk message is quarantined; in some embodiments the junk message is deleted. If, however, the reliable junk classifier is unable to determine whether the message is junk, control is then optionally transferred from 308 to 310, where other classification techniques are applied. In some embodiments, the statistical classifier is used to further test the message. If the other classification techniques determine that the message is a good message, control is then transferred from 312 to 318 where the good message is processed as such. If the message is classified as junk, control is transferred from 312 to 320, where the junk message is processed accordingly. Whether the message is determined to be good or junk, this information is useful for updating the statistical classifier. Thus, control is transferred to updating the statistical classifier (322) from both 318 and 320. The order of testing may be different for other embodiments. Although the reliable classifiers are preferably machine classifiers, the process is also applicable to classifications done by a person.

There are several ways to update the statistical classifier. In some embodiments, a training set is updated using the tokens or features of the classified message. In some embodiments, a statistical model used by the classifier is updated to reflect the classification information derived from the message. In some embodiments, in order to protect the privacy of email recipients, the information pertaining to the messages is encrypted. In some embodiments, the encryption is omitted since the tokens or features in the messages are parsed and stored in such a way that the original message cannot be easily reconstructed and thus does not pose a serious threat to privacy.

An example is shown below to illustrate how the statistical model is improved using classified messages. The reliable classifiers classify received messages and provide the statistical message classifier with a knowledge base. A message is parsed to obtain various features. If the message is determined to be good, the "good count" for each of the features in the message is incremented, and if the message is determined to be spam, the "spam count" for each of the features in the message is decremented. Table 1 is used in some embodiments to store various features and the number of times they are determined either as good or spam:

TABLE 1

| Feature Name | Good Count | Spam Count |
| --- | --- | --- |
| mortgage | 10 | 1 |
| auto | 1 | 10 |
| greeting | 3 | 1 |
| ... | ... | ... |

In some embodiments, user inputs are used to augment the classification made by the reliable classifiers. Since the user's decisions are ultimately the most reliable classification available, the user-augmented classification is given extra weight in some embodiments. Table 2 is used in some embodiments to track the user classification. If a non-spam or unclassified message delivered to a user is determined to be junk by the user, the junk count is then incremented. If the message is determined to be junk by the classifier, but the user reverses the decision, the unjunk count is then incremented. Optionally, a whitelist counter is used to track the number of times a feature has appeared in whitelisted emails. Typically, a whitelisted email is email that comes from an address stored in the recipient's address book or an address to which the recipient has previously sent a message. Instead of scoring all the whitelisted messages, in some embodiments a portion of whitelisted messages are processed.

TABLE 2

| Feature Name | Junk Count | Unjunk Count | Whitelist Count | Score |
| --- | --- | --- | --- | --- |
| mortgage | 552 | 7 | 7 | −3.33 |
| auto | 132 | 5 | 186 | 0.58 |
| greeting | 16 | 1 | 11 | 0.07 |
| ... | ... | ... | ... | ... |

A score for each feature may be computed based on the counter values in the tables and a predetermined score function. In one embodiment, the score is computed based on counters from both tables using the following equations:

$$CountA = S1*SpamCount + S2*JunkCount \quad \text{(equation 1)}$$

$$CountB = S3*GoodCount + S4*UnjunkCount + S5*WhiteListCount \quad \text{(equation 2)}$$

$$FeatureScore = SCORE\_FUNCTION(CountA, CountB) \quad \text{(equation 3)}$$

where S1, S2, S3, S4 and S5 are learning parameters of the system that may be adapted to minimize error rate, and SCORE_FUNCTION is a function dependent on the statistical model that is used.

In one embodiment, the learning parameters are all equal to 1 and the following score function is used:

$$SCORE\_FUNCTION = -\log\left(\frac{CountA + A}{TotalSpam + B}\right) + \log\left(\frac{CountB + A}{TotalGood + B}\right), \quad \text{(equation 4)}$$

where TotalSpam is the total number of spam messages identified and TotalGood is the total number of good messages identified, and A and B are prior constants that may vary in different implementations. In this embodiment, A is 10 and B is 250. For example, if "cash" occurs in 200 of 1,000 spam messages and three out of 500 non-spam messages, its feature score is computed as the following:

$$SCORE\_FUNCTION = -\log\left(\frac{200 + 10}{1000 + 250}\right) + \log\left(\frac{3 + 10}{500 + 250}\right) = -2.2713$$

A technique for improving a statistical message classifier has been disclosed. In some embodiments, the statistical message classifier is updated according to message classification by a machine classifier. In some embodiments, the statistical message classifier is updated according to the classification made by one or more other type of classifiers. These techniques reduce the amount of labor required for training a statistical message classifier, and make such classifier more suitable for server deployment.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for classifying a message, the method comprising:

maintaining a table of message features in memory, wherein each message feature corresponds to a good count and a spam count, and wherein the good count is based on a number of times the message feature is associated with a previously received message determined not to be unsolicited and the spam count is based on a number of times the message feature is associated with a previously received message determined to be unsolicited;

receiving a message for analysis;

determining that a sender address of the received message is not in a database of known sender addresses;

identifying one or more message features in the received message;

tracking user classification of previously received messages, wherein the user classification indicates whether the previously received messages are junk or unjunk, the user classification maintained in a table stored in memory;

computing a score for each message feature identified in the received message based on the good count and spam count associated with the identified message feature and user classification of received messages associated with the identified message feature;

determining that the received message is an unsolicited message based on the computed score; and processing the received message according to the score derived from analysis of the identified message features in the received message.

2. The method of claim 1, wherein the score derived from the analysis of the received message indicates that the received message is an unsolicited message, and processing the received message includes deleting the received message.

3. The method of claim 1, wherein the score derived from the analysis of the received message indicates that the received message is an unsolicited message, and processing the received message includes quarantining the received message.

4. The method of claim 1, wherein the score derived from the analysis of the received message is inconclusive as to whether the received message is an unsolicited message, and processing the received message includes further analyzing the received message, wherein further analysis determines whether the received message is an unsolicited message.

5. The method of claim 4, wherein further analysis of the received message indicates that the received message is an unsolicited message, and the received message is deleted.

6. The method of claim 5, further comprising updating a statistical classifier in response to analysis of the received message indicating that the received message was an unsolicited message.

7. The method of claim 4, wherein further analysis of the received message indicates that the message is an unsolicited message, and the received message is quarantined.

8. The method of claim 7, further comprising updating a statistical classifier in response to analysis of the received message indicating that the received message was an unsolicited message.

9. The method of claim 1, wherein the score derived from the analysis of the received message indicates that the received message is not an unsolicited message, and processing the received message includes delivering the intended message to an intended recipient.

10. The method of claim 9, further comprising updating a statistical classifier in response to analysis of the received message indicating that the received message was not an unsolicited message.

11. The method of claim 10, 5, or 8, wherein updating a statistical classifier includes updating tokens or features corresponding to received messages.

12. The method of claim 11, wherein the tokens or features includes an automatically incremented indicia of received messages not being an unsolicited message and an automatically incremented indicia of received messages being an unsolicited message.

13. The method of claim 12, wherein the tokens or features may be further augmented by a direct user classification of received messages being an unsolicited message or not being an unsolicited message.

14. The method of claim 13, wherein the tokens or features may be further augmented by an indirect user classification of received messages being an unsolicited message or not being an unsolicited message.

15. The method of claim 14, wherein the indirect user classification is removal of a received message from a message quarantine to an inbox or removal of a received message from an inbox to a message quarantine.

16. The method of claim 1, wherein the database of known sender addresses is derived from an address in a recipient address book.

17. The method of claim 1, wherein the database of known sender addresses is derived from an address to which an intended recipient has previously sent a message.

18. An apparatus for classifying a message, the apparatus comprising:

a processor configured to execute a program stored in memory, wherein execution of the program by the processor:

identifies one or more message features in a received message, tracks user classification of previously received messages, wherein the user classification indicates whether the previously received messages are junk or unjunk and wherein the user classification is maintained in a table stored in memory, computes a score for each identified message feature, the score based on a good count and spam count associated with the identified message feature and the user classification of previously received messages associated with the identified message feature, and processes the received message according to the score derived from analysis of the one or more identified features in the received message;

memory configured to store information regarding the one or more identified message features of previously received messages, the information regarding the one or more identified message features used to compute the score for each identified message feature; and a database of known sender addresses, wherein processing of the received message is further based on a determining whether a sender of the received message has a known sender address.

19. The apparatus of claim 18, wherein the database of known sender addresses is derived from an address in a recipient address book.

20. The apparatus of claim 18 further comprising a whitelist counter stored in memory and executable by the processor to track the number of times an identified message feature has appeared in a whitelisted message.

21. The apparatus of claim 20, wherein a value from the whitelist counter is used to compute the score associated with the identified message feature.

* * * * *